United States Patent [19]

Kirpluk et al.

[11] Patent Number: 4,556,189
[45] Date of Patent: Dec. 3, 1985

[54] CRT MONITOR TILT MECHANISM

[75] Inventors: Kenneth R. Kirpluk, Elmwood Park; Kenneth F. Lewinski, Hoffman Estates, both of Ill.

[73] Assignee: AT&T Teletype Corporation, Skokie, Ill.

[21] Appl. No.: 577,094

[22] Filed: Feb. 6, 1984

[51] Int. Cl.⁴ .............................................. F16M 1/00
[52] U.S. Cl. ..................................... 248/649; 248/371
[58] Field of Search ............... 248/649, 359 C, 359 R, 248/359 E, 371, 188.2, 650, 183, 372.1; 358/254; 179/2 TV; 108/1, 2

[56] References Cited

U.S. PATENT DOCUMENTS

| | | | |
|---|---|---|---|
| 1,549,144 | 8/1925 | Messegee | 248/188.2 |
| 1,612,276 | 12/1926 | Fitz | 248/649 |
| 2,418,236 | 4/1947 | Schramka | 248/188.2 |
| 3,448,950 | 6/1969 | Kluge | 248/649 |
| 3,789,140 | 1/1974 | McQueen | 358/254 |
| 3,970,792 | 7/1976 | Benham | 179/2 TV |
| 4,349,173 | 9/1982 | Volka et al. | 248/183 X |
| 4,372,515 | 2/1983 | Noonan | 248/178 |
| 4,474,352 | 10/1984 | Nishi | 248/183 X |

FOREIGN PATENT DOCUMENTS 1041712 11/1978 Canada ............................. 248/188.2

Primary Examiner—J. Franklin Foss
Attorney, Agent, or Firm—A. A. Tirva

[57] ABSTRACT

A mechanism for tilting a display screen of a CRT housed in a cabinet includes a projection extending from the bottom surface of the cabinet for supporting one end of the cabinet and providing a pivot point for tilting the cabinet. A foot slidably mounted at the other end of the cabinet supports that end at a selectable height; the foot having a ratchet rack on one of its surfaces is normally engaged by a detent lever locking the foot in position.

4 Claims, 5 Drawing Figures

CRT MONITOR TILT MECHANISM

TECHNICAL FIELD

This invention relates to a display screen of a cathode ray tube and more particularly to a mechanism for adjusting the angle of viewing of such a screen.

BACKGROUND OF THE INVENTION

Use of cathode ray tubes (CRTs) in connection with business machines for production of displays on their display screens in response to operator-controlled keyboards has become commonplace. Time loss resulting from error correction in production of printed machine output has been minimized by such use. However, variation in operator height, or ambient conditions of tube use can result in glare from the display screen, thereby reducing operator efficiency. To prevent or minimize glare, a display screen should be tiltable for changing the angularity or pitch of viewing the screen.

Unitl now, a number of various mechanisms have been developed for tilting display screens of CRTs. One of these comprises a rockable platform on which a CRT is mounted within a cabinet. Another mechanism includes a yoke-shaped bracket which is driven linearly in response to manual rotation of a knob, the bracket being coupled to a CRT relatively remote from its display screen. Yet another mechanism comprises a driven worm gear meshed with a gear secured to a shaft which in turn is fastened to the neck of a CRT.

Each of the heretofore known mechanisms, while efficient for changing tube angularity or pitch, is relatively expensive, because each requires a plurality of parts some of which require accurate machining; and additionally, usually most parts are located within a cabinet enclosing the CRT and associated electronics making the assembly of the mechanisms difficult and time-consuming.

DISCLOSURE OF THE INVENTION

In accordance with the present invention, we provide a mechanism for tilting a display screen of a CRT disposed within a cabinet. The cabinet has extending from its bottom surface a projection which supports one end of the cabinet and provides a pivot point about which the cabinet may be tilted. A foot, slidably mounted at the other end of the cabinet, supports that end at a selected height. A detent lever slidably attached to the bottom surface of the cabinet is arranged to normally be in engagement with a ratchet rack located on a surface of the foot locking the foot in position.

THE DRAWING

DETAILED DESCRIPTION

Figure 1:
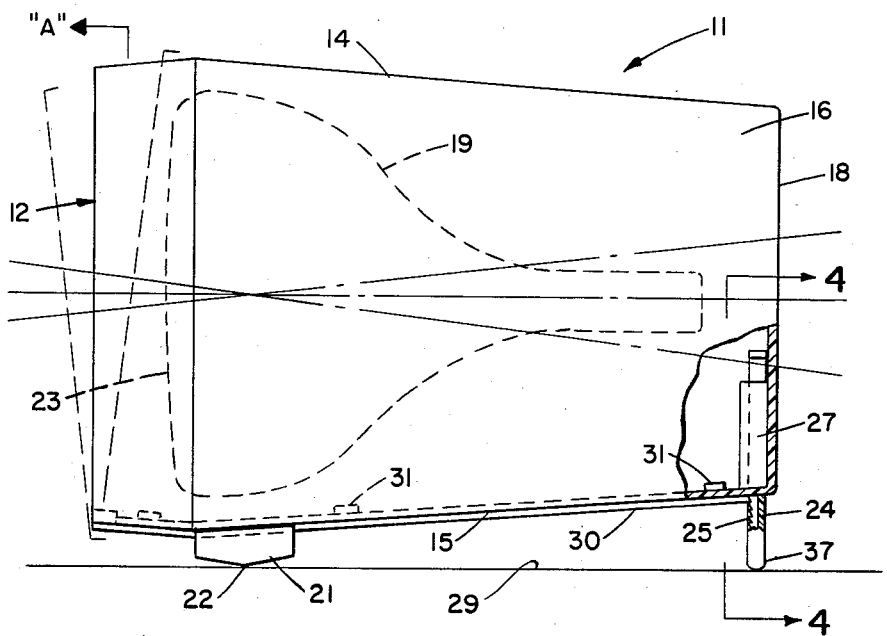
FIG. 1 shows a partial side elevation of a CRT cabinet with a tilt mechanism in accordance with the invention.
Figure 2:
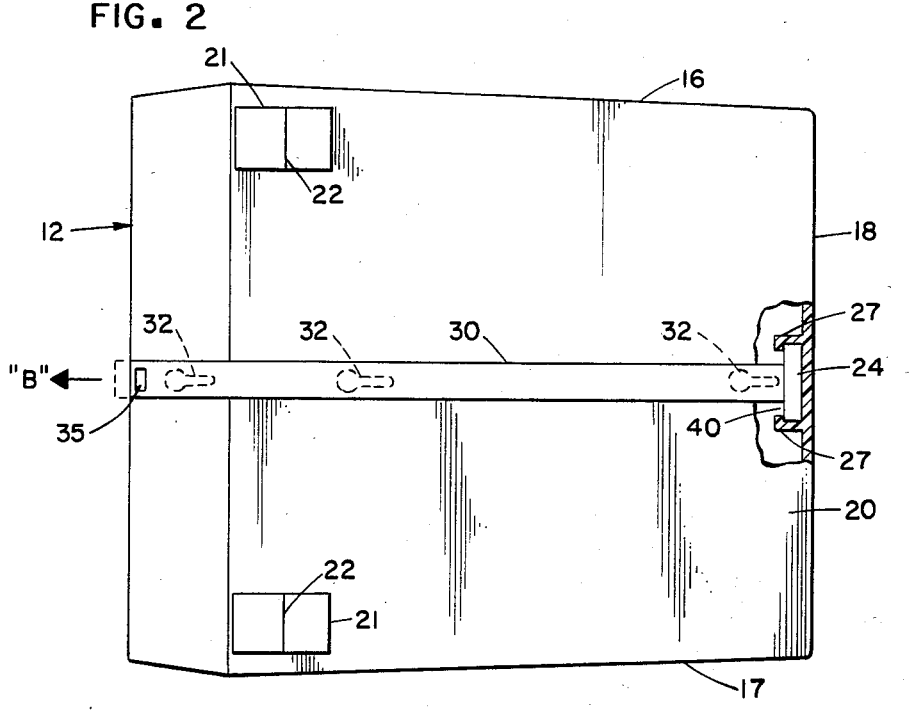
FIG. 2 shows a bottom elevation of the cabinet shown in FIG. 1.
Figure 3:
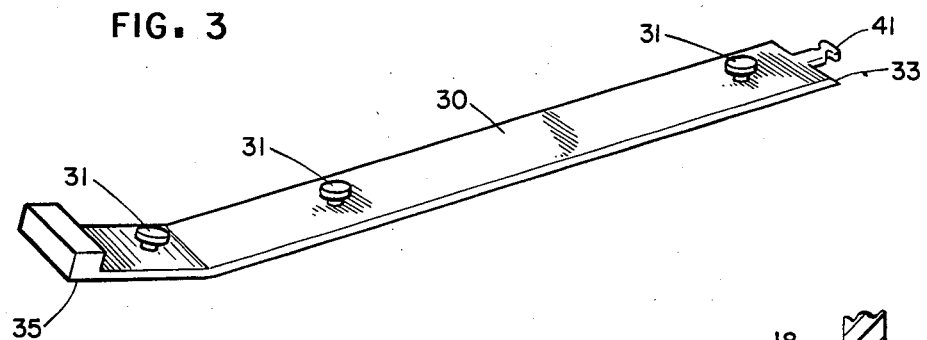
FIG. 3 shows an isometric view of a detent lever of the tilt mechanism.
Figure 4:
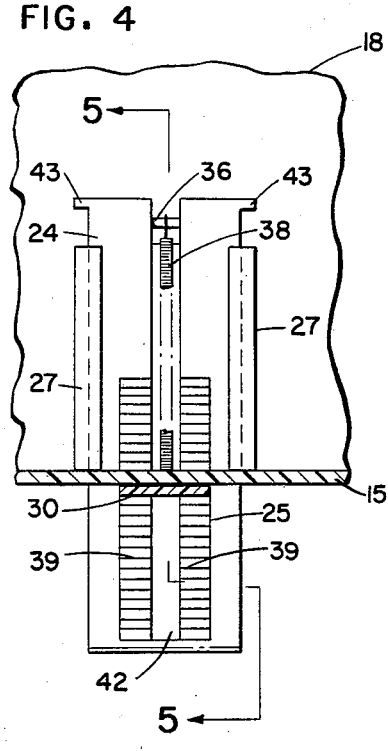
FIG. 4 is a cross-sectional view of the cabinet taken along line 4—4 of FIG. 1.

FIG. 1 shows a partial side elevation of a cabinet 11 having a front 12, with an opening 13 (not shown), a top 14 and a bottom 15 joined by sides 16 and 17 and a back 18. The cabinet 11 is adapted to house a CRT 19, which is positioned within the cabinet 11 so that the image display screen 23 of the CRT 19 is visible through the opening 13. The cabinet 11 has extending from its bottom surface 20 two projections 21, shown in FIG. 2, which terminate in knifelike edges 22. The projections 21 are located near the front 12 and sides 16 and 17, respectively, and have their edges 22 aligned so that they are substantially parallel to the image display screen 23. When the cabinet 11 is placed on a flat supporting surface 29, such as the top of a deck (not shown), the projections 21 support the front portion of the cabinet 11 and the edges 22 provide a pivot line about which the cabinet 11 may be tilted to change an operator's angle of viewing the display screen 23.

The back portion of the cabinet 11 is supported by a foot 24 which is slidably mounted on the back 18 of the cabinet 11. The foot 24 has a rectangular shape and is mounted inside the cabinet 11 by insertion into a channel guide 27 located on the back 18 of the cabinet 11. The guide 27 has its longitudinal axis parallel to the vertical axis of the cabinet 11 and has a slot 40 extending the length of the guide 27 and opening into the cabinet 11. The dimensions of the channel 27 are such that the foot 24 is free to slide within the channel 27. One end of the channel 27 is connected to an aperture 28 (FIG. 5) located in the bottom 15 of the cabinet 11. Aperture 28 permits an end 37 of the foot 24 to exit outside the cabinet 11 and contact the supporting surface 29. A two row ratchet rack 25 having a plurality of teeth 39 is located on one longitudinal surface of the foot 24. The foot 24 is oriented in the guide 27 so as to align and place the teeth 39 across from the slot 40.

A detent lever 30 is slidably mounted on the bottom surface 20 of the cabinet 11 by having mounting posts 31 extending from the lever 30 engage slots 32 located in the bottom 15 of the cabinet 11. The detent lever 30, the foot 24 and the cabinet 11 may all be molded from a thermoforming type of plastic material. One end of the detent lever 30 is shaped in the form of a pawl 33 and is adapted to mesh with the teeth 39 of the ratchet rack 25.

Figure 5:
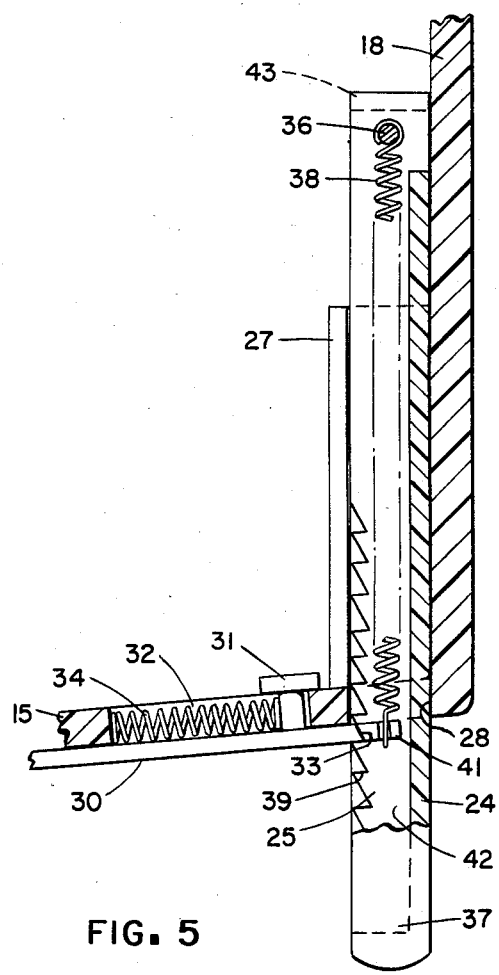
FIG. 5 is a cross-sectional view of the cabinet taken along line 5—5 of FIG. 4.

A compression spring 34 located in one of the slots 32 between the bottom 15 of the cabinet 11 and one of the mounting posts 31 develops a force which pushes the detent lever 30 towards the back 18 and the foot 24 keeping the pawl 33 in engagement with the ratchet rack 25. The shapes of the teeth 39 and the pawl 33, as shown in FIG. 5, are such that when the pawl 33 is in engagement with the rack 25, the foot 24 is movable in only one direction, downwards and out of the cabinet 11.

Normally, a portion of the weight of the cabinet 11 is transmitted via the detent lever 30 and the pawl 33 to the teeth 39 of the ratchet rack 35 locking the foot 24 in place. To release the foot 24, the other end of the detent lever 30 has a finger or a hand grip area 35 for application of a force on the detent lever 30 to overcome the force developed by the compression spring 34 and thus to disengage the pawl 33 from the ratchet rack 25.

A hook 36 is located on a portion of the foot 24 located opposite the end 37. An extension spring 38 has one end attached to the hook 36 and the other end attached to a tab 41 of the detent lever 30. The tab 41 slides in a channel 42 located between the two rows of the ratchet rack 25. The extension spring 38 exerts a force on the foot 24 pushing the foot 24 down and out of the cabinet 11 thus enabling the end 37 to maintain contact with the supporting surface 29. The force exerted by the extension spring 28 is less than the force exerted on the foot 24 through the detent lever and the pawl 33 by the weight of the cabinet 11. Downward travel of the foot 24 is limited by portions 43 which extend from the sides of the foot 24 more than the width of the channel guide 27.

The operation of the tilt mechanism may be best understood by describing how the change in the angle of viewing of the display screen 23 is effected by the raising or lowering of the back end of the cabinet 11 thereby pivoting the cabinet 11 about the edges 22. To raise the back of the cabinet 11, a force "A" is applied to the top 14 of the cabinet 11 in a direction as shown in FIG. 1. An operator can normally accomplish this by placing one hand on the top 14 of the cabinet 11 and pulling the cabinet towards himself. This action takes the weight of the cabinet 11 off the foot 24, and the force exerted by the extension spring 28 is now able to move the foot 24 downward enabling the end 37 to maintain contact with the supporting surface 29 as the back of the cabinet 11 is elevated. Once the desired angle of viewing is reached, the force "A" is relaxed shifting the weight of the cabinet 11 back through the detent lever 30 and pawl 33 to the foot 24. When a sufficient amount of weight of the cabinet 11 is shifted back to the foot 24 to overcome the force developed by the extension spring 28, the foot 24 is locked in place by the detent lever 30 ratchet rack 25 combination.

To tilt the cabinet 11 the opposite way, a force "B" is exerted on the detent lever 23 disengaging the pawl 33 from the ratchet rack 25. When the detent lever 33 disengages from the ratchet rack 25, the weight of the cabinet 11 overcomes the force developed by the extension spring 28 and forces the foot 24 up into the cabinet 11. The cabinet 11 pivots about the edges 22, and the back end of the cabinet 11 moves towards the supporting surface 29. Keeping the detent lever 23 disengaged from the ratchet rack 25 will allow the back end of the cabinet 11 to eventually settle on the supporting surface 29.

What is claimed is:

1. A mechanism for tilting a display screen of a CRT disposed within a cabinet having a top and a bottom joined by two sides, a back and a front having an opening to permit viewing of the display screen, the mechanism comprising:
    means for supporting the front end of the cabinet on a substantially flat mounting surface;
    means for pivoting the cabinet about the support means;
    means for supporting the back end of the cabinet at a selected height above the mounting surface including:
    a foot slidably mounted on the back of the cabinet and arranged to move in a path substantially parallel to the vertical center line of the cabinet;
    the foot having a first end adapted to contact the mounting surface;
    means for urging the foot in the direction towards the bottom of the cabinet and into contact with the mounting surface, including an extension spring having one end connected to the second end of the foot and having the other connected to the detent lever;
    means for preventing the foot from moving in the direction towards the top of the cabinet including:
    a ratchet rack having a plurality of teeth located on a surface of the foot;
    a detent layer slidably mounted on the bottom of the cabinet, the lever having one end shaped as a pawl adapted to engage the ratchet rack; and
    means for urging the pawl into engagement with the ratchet rack.

2. A mechanism in accordance with claim 1 wherein means for supporting the front end of the cabinet includes at least one projection extending from the bottom surface of the cabinet, the projection terminating in a knifelike edge substantially parallel to the display screen.

3. A mechanism in accordance with claim 1 wherein the means for urging the pawl into engagement with the ratchet rack includes a compression spring.

4. A mechanism for tilting a display screen of a CRT disposed within a cabinet located on a substantially flat mounting surface, the cabinet having a top and a bottom joined by two sides, a back and a front having an opening to permit viewing of the display screen, the mechanism comprising:
    a projection extending from the bottom of the cabinet supporting the front end of the cabinet above the mounting surface;
    the projection terminating in a knifelike edge substantially parallel to the display screen cabinet, the edge providing a pivot line for the cabinet;
    a foot slidably mounted on the back of the cabinet and arranged to move in a path substantially parallel to the vertical center line of the cabinet;
    the foot having a first end adapted to contact the mounting surface;
    a ratchet rack having a plurality of teeth located on a surface of the foot;
    a detent lever slidably mounted on the bottom surface of the cabinet, the lever having one end shaped as a pawl adapted to engage the ratchet rack preventing the foot from moving in the direction towards the top of the cabinet thereby determining the extent of elevation of the back end of the cabinet above the mounting surface;
    a compression spring for urging the pawl into engagement with the ratchet rack; and
    an extension spring having one end connected to the second end of the foot and having the other end connected to the detent lever for urging the foot in the direction towards the bottom of the cabinet and the first end of the foot into engagement with the mounting surface.

* * * * *